(12) United States Patent
Nikitin et al.

(10) Patent No.: US 8,314,746 B2
(45) Date of Patent: Nov. 20, 2012

(54) WIRELESS ENCODER APPARATUS AND METHODS

(75) Inventors: Pavel Nikitin, Seattle, WA (US); Venkata Kodukula, Bothell, WA (US)

(73) Assignee: Intermec IP Corp., Everett, WA (US)

( * ) Notice: Subject to any disclaimer, the term of this patent is extended or adjusted under 35 U.S.C. 154(b) by 685 days.

(21) Appl. No.: 12/411,232

(22) Filed: Mar. 25, 2009

(65) Prior Publication Data

US 2009/0251379 A1 Oct. 8, 2009

Related U.S. Application Data

(60) Provisional application No. 61/041,661, filed on Apr. 2, 2008.

(51) Int. Cl.
*H01Q 1/52* (2006.01)
(52) U.S. Cl. ...................... 343/841; 340/572.1
(58) Field of Classification Search .............. 340/572; 235/375, 487, 492; 343/841
See application file for complete search history.

(56) References Cited

U.S. PATENT DOCUMENTS

| 6,147,604 | A | 11/2000 | Wiklof et al. |
| 6,371,375 | B1 | 4/2002 | Ackley et al. |
| 6,784,789 | B2 | 8/2004 | Eroglu et al. |
| 2005/0002720 | A1 | 1/2005 | Hohberger et al. |
| 2005/0045723 | A1 | 3/2005 | Tsirline et al. |
| 2007/0040680 | A1 | 2/2007 | Chiu |
| 2007/0063843 | A1 | 3/2007 | Tsirline et al. |
| 2007/0099566 | A1 | 5/2007 | Borisov et al. |
| 2007/0120670 | A1 | 5/2007 | Torchalski |
| 2007/0147938 | A1 | 6/2007 | Brown et al. |
| 2007/0171071 | A1 | 7/2007 | Chiu et al. |
| 2008/0117027 | A1* | 5/2008 | Tsirline et al. .............. 340/10.6 |
| 2008/0186177 | A1* | 8/2008 | Nikitin et al. .............. 340/572.1 |
| 2010/0024669 | A1* | 2/2010 | Feltz et al. .................... 101/212 |

OTHER PUBLICATIONS

Hugh et al., "Chip Placement on Smart Label," U.S. Appl. No. 09/164,200, filed Sep. 30, 1998, 18 pages.
Wiklof et al., "Memory Tag and Method of Manufacture," U.S. Appl. No. 09/164,203, filed Sep. 30, 1998, 26 pages.

* cited by examiner

*Primary Examiner* — Jacob Y Choi
*Assistant Examiner* — Kyana R McCain
(74) *Attorney, Agent, or Firm* — Seed IP Law Group PLLC

(57) ABSTRACT

A wireless encoder for encoding a plurality of wireless communication devices carried by media comprises a shielded enclosure having an exterior surface defining an aperture; a wireless signal generator to excite the shielded enclosure; and a media path along which media carrying a plurality of wireless communication devices travels. The media path passes across the aperture outside the shielded enclosure.

25 Claims, 12 Drawing Sheets

WIRELESS ENCODER APPARATUS AND METHODS

CROSS-REFERENCE TO RELATED APPLICATION

This application claims the benefit under 35 U.S.C. §119 (e) of U.S. Provisional Patent Application Ser. No. 61/041,661, filed Apr. 2, 2008, entitled "Wireless Encoder Apparatus and Methods", which is incorporated herein by reference in its entirety.

BACKGROUND

1. Technical Field

This description generally relates to the field of wireless communication devices, and more particularly to encoding wireless communication devices.

2. Description of the Related Art

Wireless communication devices, including wireless memory devices for storing and retrieving data, such as radio frequency identification ("RFID") tags, are used in a variety of environments. Such devices typically employ an antenna structure coupled to a wireless transponder circuit to transmit and/or receive data via electromagnetic signals in some frequency range.

Antenna structures may include a primary antenna element driven by a transmitter to transmit data in an outgoing signal and/or driven by an external signal from an external source to receive incoming data. Antenna structures may further include parasitic antenna elements that electromagnetically cooperate with the primary antenna element to enhance the transmission or reception of a signal.

The wireless transponder circuit found in many wireless memory devices typically includes a memory portion and a logic portion. The memory portion stores data, while the logic portion controls the reading, writing, and manipulation of data in the memory portion. The logic portion may further couple between the memory portion and the antenna to act as a transmitter, receiver, or transceiver for reading and/or writing data to and/or from the wireless memory device.

Active wireless communication devices include a discrete consumable power source, such as a battery, to provide power to the wireless transponder circuit. In contrast, passive wireless communication devices derive power from a wireless interrogation signal, for example, by backscattering the signal as a response signal encoded with information from the wireless memory device.

Wireless communication devices may be provided in an array spaced at predetermined increments along media or another substrate. Before deployment, a wireless encoder (often referred to as a "printer") may be used to send an electromagnetic signal conveying information to each wireless communication device as the media carrying the wireless communication devices is passed through or adjacent the wireless encoder. The wireless encoder may be used to pre-program or otherwise configure each wireless communication device for a particular application.

Many existing wireless encoders use radio frequency couplers in the form of transmission lines terminated with matched loads. The fields emerging from such radio frequency couplers are typically not well contained and are strongly affected by the propagation environment inside the wireless encoder and by the form factor of wireless communication devices passing by the coupler. Thus, such wireless encoders may be inefficient in attempting to communicate with wireless communication devices of various shapes and sizes within wireless encoders having different metal parts.

In order to write to each wireless communication device separately, the wireless encoder may use a short-range, less powerful antenna in an attempt to encode only the nearest wireless communication device as it passes.

BRIEF SUMMARY

In one embodiment, a wireless encoder for encoding a plurality of wireless communication devices carried by media comprises: a shielded enclosure having an exterior surface defining an aperture; a wireless signal generator configured to excite the shielded enclosure; and a media path along which media carrying a plurality of wireless communication devices travels, the media path passing across the aperture outside the shielded enclosure.

In another embodiment, a wireless encoder for encoding a plurality of wireless communication devices carried by media comprises: a shielded enclosure having an exterior surface defining at least two apertures; at least one detuning flange extending externally to the shielded enclosure near at least one of the at least two apertures; a wireless signal generator configured to excite the shielded enclosure; and a media path along which media carrying a plurality of wireless communication devices travels, the media path passing adjacent the at least one detuning flange and through the shielded enclosure via the at least two apertures.

In yet another embodiment, a wireless encoder for encoding a plurality of wireless communication devices carried by media comprises: a shielded enclosure having an exterior surface defining at least two apertures, the shielded enclosure at least partially filled with a dielectric material; a wireless signal generator configured to excite the shielded enclosure; and a media path along which media carrying a plurality of wireless communication devices travels, the media path passing through the shielded enclosure via the at least two apertures.

In another embodiment, a method of encoding wireless communication devices comprises: generating a wireless signal; exciting a shielded enclosure having an exterior surface defining an aperture with the wireless signal; and encoding a wireless communication device by passing the wireless communication device across the aperture outside the shielded enclosure.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with wireless encoders, wireless communications devices, such as RFIDs, control circuitry and dielectric materials have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract provided herein are for convenience only and do not interpret the scope or meaning of the embodiments.

Description of an Exemplary Wireless Encoder

Figure 1:
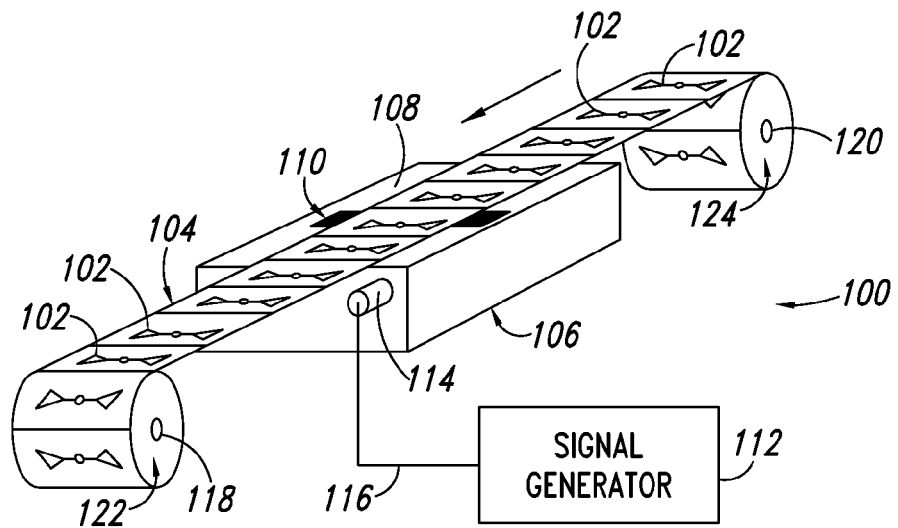
FIG. 1 is a perspective view of a wireless encoder encoding a plurality of wireless communication devices, according to one illustrated embodiment.

FIG. 1 is a perspective view of a wireless encoder 100 encoding a plurality of wireless communication devices 102 carried by media 104, according to one illustrated embodiment. As used herein, the term "encode" is broadly construed to include, without limitation, wirelessly transmitting, wirelessly programming, or otherwise wirelessly loading information, data, executable instructions, or operating instructions into a wireless communication device 102.

In the illustrated embodiment, the wireless encoder 100 includes a shielded enclosure 106 having an exterior surface 108 defining an aperture 110. The shielded enclosure 106 may be configured to substantially prevent external electromagnetic fields from penetrating to an interior of the shielded enclosure 106, and to substantially prevent internal electromagnetic fields from escaping to an exterior of the shielded enclosure 106 except via the aperture 110. In one embodiment, the shielded enclosure 106 serves as a radio frequency (RF) cavity, within which electromagnetic signals for encoding the wireless communication devices 102 may be generated.

The shielded enclosure 106 may comprise any of a variety of materials operable to shield electromagnetic fields. In one embodiment, the shielded enclosure 106 may comprise a substantially continuous metallic enclosure formed from any of a variety of metals. In another embodiment, the shielded enclosure 106 may comprise a metallic matrix or mesh, the matrix having holes substantially smaller than a wavelength of the shielded electromagnetic radiation. This metallic matrix may be formed within another material, such as a polymer, or may form the walls of the shielded enclosure 106 alone. In other embodiments, other conductive materials and different configurations for the shielded enclosure 106 may be used.

As illustrated in FIG. 1, the shielded enclosure 106 defines a generally empty RF cavity. However, in other embodiments, the shielded enclosure 106 may be at least partially filled, for example, with a dielectric material (as discussed in greater detail below). In still other embodiments, the shielded enclosure 106 may have other conducting structures positioned within (e.g., a wave conductor running from one wall to another wall in order to support the propagation of transversal electromagnetic modes). The shielded enclosure 106 may also have any of a variety of shapes. As illustrated, the shielded enclosure 106 comprises a parallelepiped cavity. In other embodiments, however, the shielded enclosure 106 may be spherical, elliptical, cylindrical, etc. Such shapes may be useful in particular applications, based on size or other considerations for the wireless encoder 100. In other embodiments, the shielded enclosure 106 may comprise a plurality of cavities coupled together.

The shielded enclosure 106 may be constructed in a variety of sizes. In the illustrated parallelepiped embodiment, in order to ensure resonance within the shielded enclosure 106, at least two of the dimensions of the shielded enclosure 106 may be made larger than or equal to half a wavelength of an electromagnetic signal generated therein. Thus, for example, if a 900 MHz signal is generated in the shielded enclosure 106, then the shielded enclosure 106 may include two dimensions of at least approximately 16.5 cm, and an arbitrary third dimension. By including dielectric materials (particularly those dielectric materials having dielectric constants greater than that of air) within the shielded enclosure 106, the shielded enclosure 106 may be made even smaller. In one embodiment, the dimensions of the shielded enclosure 106 may shrink as the square root of the dielectric constant of the included dielectric materials (provided that the shielded enclosure 106 is filled with the dielectric). In other embodiments, different shapes and sizes of the shielded enclosure 106 may be implemented in order to properly tune the RF cavity to the frequencies generated within. Thus, the shielded enclosure 106 may function as an RF resonator and may be substantially unaffected by the outside environment.

The aperture 110 may comprise a generally rectangular portal defined through the exterior surface 108 of the shielded enclosure 106. As described in greater detail below, the aperture 110 may be configured to allow electromagnetic signals generated within the shielded enclosure 106 to escape therethrough, in order to encode at least one adjacent wireless communication device 102. The aperture 110 may comprise any of a variety of shapes. The dimensions of the aperture 110 may also be chosen based at least in part on the characteristics of electromagnetic signals generated within the shielded enclosure 106, as well as the dimensions of the wireless communication devices 102. In one embodiment, the aperture 110 may be sized and configured such that one wireless communication device 102 at a time may be encoded by the wireless encoder 100. Particular dimensions for the aperture 110 are discussed in greater detail below.

In another embodiment, a plurality of apertures may be defined through the exterior surface 108 of the shielded enclosure 106. The plurality of apertures may have a plurality of different shapes specially configured to enable communication with wireless communication devices 102 of different types and positioned in different orientations with respect to the shielded enclosure 106. In another embodiment, the plurality of apertures may also be placed in a variety of different orientations relative to the media path along which the wireless communication devices 102 travel. These different orientations may also facilitate communication with different wireless communication devices 102.

The wireless encoder 100 may further include a wireless signal generator 112 configured to generate electromagnetic signals and thereby excite the shielded enclosure 106. For example, the shielded enclosure 106 may be excited by a resonator excitation structure (e.g., antenna 114) driven by the wireless signal generator 112 via a lead 116.

In one embodiment, the wireless signal generator 112 may include wireless transceiver circuitry (not shown) for generating the electromagnetic signals transmitted via the antenna 114. The electromagnetic signals may include any type of information/data for encoding the wireless communication devices 102. In certain embodiments, the wireless transceiver circuitry of the wireless signal generator 112 may be further configured to receive and interpret electromagnetic signals from the wireless communication devices 102, facilitating two-way communication during the encoding process.

The wireless signal generator 112 may further include control circuitry for controlling the wireless transceiver circuitry in order to individually encode each wireless communication device 102 that passes across the aperture 110, as described in greater detail below. The control circuitry may comprise one or more logic processing units, such as one or more central processing units (CPUs), digital signal processors (DSPs), application-specific integrated circuits (ASICs), field programmable gate arrays (FPGAs), etc. The control circuitry may be configured to execute firmware/software instructions, or hardwired, logic-defined functions. In one embodiment, the control circuitry may be used to select and organize the information transmitted via the wireless transceiver circuitry to the wireless communication devices 102.

The wireless signal generator 112 may excite the shielded enclosure 106 by any of a variety of resonator excitation structures. In one embodiment, the antenna 114 may be electrically coupled to the wireless signal generator 112 via the lead 116 and may transmit an electromagnetic signal originating at the wireless signal generator 112. The antenna 114 may be detachably coupled to the wireless signal generator 112 to facilitate replacement of one or both of these components. As is more easily seen in FIG. 2, the antenna 114 may comprise a metallic rod extending through at least a portion of the shielded enclosure 106.

In other embodiments, the antenna 114 may be otherwise arranged and structured in order to effectively encode the wireless communication devices 102. For example, the antenna 114 may comprise a loop antenna, an antenna array, or another structure. The antenna 114 may also be located at any location throughout the shielded enclosure 106. In one embodiment, the antenna 114 may even be movable within the shielded enclosure 106 to improve the signal generated therein.

When the shielded enclosure 106 is excited by the wireless signal generator 112, the wireless encoder 100 may be used to encode a plurality of wireless communication devices 102 carried by the media 104 along a media path passing across the aperture 110. The wireless communication devices 102 may comprise any of a number of different structures and devices that enable wireless communication. In one embodiment, each of the wireless communication devices 102 may comprise a wireless transponder circuit and at least one antenna element. As illustrated, the wireless communication devices 102 may be horizontally oriented with respect to the wireless encoder 100. However, in other embodiments, vertically oriented wireless communication devices 102 may also be encoded along the media path.

The wireless transponder circuit of a wireless communication device 102 may include a housing surrounding its internal circuitry, which may protect the internal circuitry from environmental effects. The wireless transponder circuit may also be electrically coupled to the antenna element and include circuitry for providing and receiving modulated signals. In one embodiment, the wireless transponder circuit is a radio frequency identification (RFID) circuit and may operate over a range of frequencies, such as 860-930 MHz, 2.45 GHz, or 5.8 GHz. This range of operating frequencies may be chosen to match an operating frequency of the wireless encoder 100, as well as a wireless interrogator (not shown). In other embodiments, the wireless transponder circuit may otherwise provide structures for communicating wirelessly.

In one embodiment, the wireless transponder circuit is a passive RFID circuit lacking a discrete power source, such as a battery. By relying upon inductive powering, a passive RFID circuit may be made smaller than an "active" RFID circuit that includes a discrete power source and may have a longer operational life. In the passive embodiment, the wireless transponder circuit may further include power circuitry for generating power from an electromagnetic field. Of course, active RFID circuitry may be used in other embodiments, for example, to increase the range of the wireless communication devices 102.

The wireless transponder circuit may further comprise a read/write passive RFID circuit having a memory for storing electronic data. The memory may be in the form of memory circuits, and the wireless transponder circuit may further comprise logic circuits for storing, retrieving, and manipulating data in the memory. The wireless transponder circuit may permit the logic circuits to receive and transmit data externally via electromagnetic signals.

In one embodiment, the wireless communication devices 102 may be manufactured on and carried by a piece of media 104. As illustrated, the media 104 may comprise an elongate web of material. For example, the media 104 may simply comprise a substrate, such as paper, vellum, MYLAR®, or mesh material, to which the wireless communication devices 102 are affixed. The media 104 may further include a liner or backing, such as a silicone impregnated release liner, for use in temporarily covering an adhesive. The media 104 or a portion thereof may be divided or segmented into a plurality of pieces or segments. For example, all or a portion of the media 104 may be perforated, scored, creased or otherwise sectioned to create individual pieces or segments that may be torn or otherwise separated from one another in use. In one embodiment, each one of the pieces or segments may include one or more wireless communication devices 102.

In the illustrated embodiment, the media 104 travels along a defined media path across the aperture 110 outside the shielded enclosure 106. In one embodiment, the media path may be defined at least in part by a plurality of rollers 118, 120. The rollers 118, 120 may be configured to mount rolls holding the media 104. In one embodiment, a takeup roll 122 mounted on the roller 118 may be rotated (e.g., counterclockwise as illustrated in FIG. 1) to move the media 104 along the media path from a supply roll 124 mounted on the roller 120 that is similarly rotated. In other embodiments, other feed mechanisms may be used for transporting the media 104 along the media path.

In one embodiment, at least a section of the media path may pass very near the aperture 110, such that the wireless communication devices 102 carried by the media 104 may be encoded as they pass near the aperture 110. For example, the media path may be arranged such that the media 104 contacts the exterior surface 108 adjacent the aperture 110. The shielded enclosure 106 may be designed to allow some electromagnetic signals to escape via the aperture 110, but it may prevent the electromagnetic signals generated within the shielded enclosure 106 from escaping very far beyond the aperture 110. In addition, other portions of the exterior surface 108 adjacent the aperture 110 may function to detune wireless communication devices 102 adjacent the wireless communication device 102 currently across the aperture 110. Thus, in certain embodiments, each wireless communication device 102 may be individually encoded.

In one embodiment, a position of the shielded enclosure 106 relative to the media path may be adjustable. For example, either the shielded enclosure 106 or a feed mechanism defining the media path may be moved in certain embodiments. By adjusting the relative position of the shielded enclosure 106 and the media path, the strength and orientation of the encoding signal at the wireless communication devices 102 may be adjusted. In another embodiment, an orientation of the shielded enclosure 106 relative to the media path may also be adjustable. For example, the shielded enclosure 106 may be tilted about an axis to facilitate encoding wireless communication devices 102 oriented at different angles relative to the media path.

In one embodiment, the adjustment mechanism for modifying the position and/or orientation of the shielded enclosure 106 relative to the media path may be a manually controlled mechanical adjustment mechanism. In another embodiment, an electromechanical adjustment mechanism may be used to modify the position and/or orientation of the shielded enclosure 106 relative to the media path under automatic control (e.g., by separate control circuitry of the wireless encoder 100 and a motor or solenoid). The position and orientation of the shielded enclosure 106 may then be adjusted during use based on feedback mechanisms. For example, if the wireless encoder 100 should determine that wireless communication devices are not being properly encoded, the position of the shielded enclosure 106 relative to a media path may be automatically adjusted until the wireless communication devices are being properly encoded.

During the encoding process, the wireless signal generator 112 may excite the shielded enclosure 106 via the antenna 114. The wireless communication devices 102 may then be passed across the aperture 110 one at a time. The wireless communication devices 102 may each be encoded similarly or may be encoded using individual parameters, in accordance with commands from the control circuitry of the wireless signal generator 112. In one embodiment, a timing signal for encoding the wireless communication devices 102 as they pass across the aperture 110 may be generated automatically by the wireless signal generator 112 based on the speed with which the media 104 travels along the media path. In another embodiment, the wireless signal generator 112 may first receive a signal from a wireless communication device 102 passing across the aperture 110 and may then return an encoding signal for that wireless communication device 102 before it passes beyond the aperture 110. Other methods for individually encoding the wireless communication devices 102 may also be used.

Description of Exemplary Dimensions for a Wireless Encoder

Figure 2:
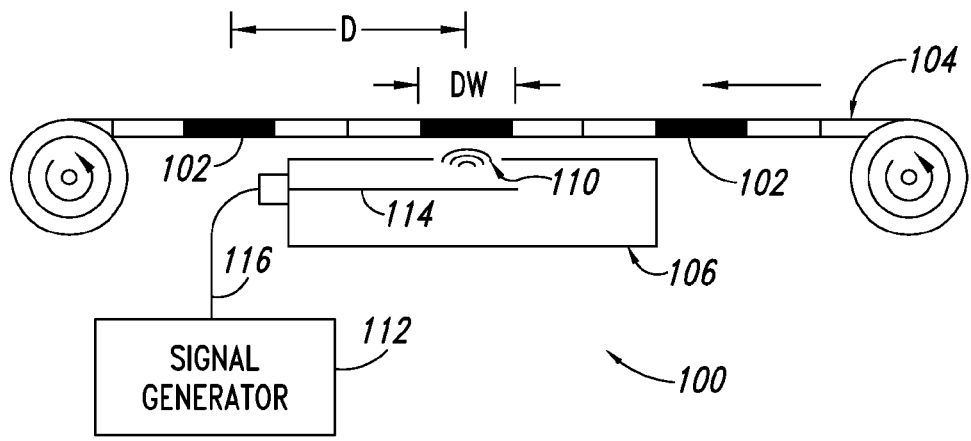
FIG. 2 is a side, schematic, cross-sectional view of the wireless encoder of FIG. 1.

FIG. 2 is a side, schematic, cross-sectional view of the wireless encoder 100 of FIG. 1. The wireless communication devices 102 are enlarged in FIG. 2 in order to more clearly illustrate and visualize exemplary dimensions for these structures. Each of the wireless communication devices 102 may be understood to have a device width, DW, defined along the direction of movement of the media path. The wireless communication devices 102 are also separated on the media 104 by a separation distance, D, from mid-point to mid-point of adjacent wireless communication devices 102.

Figure 3:
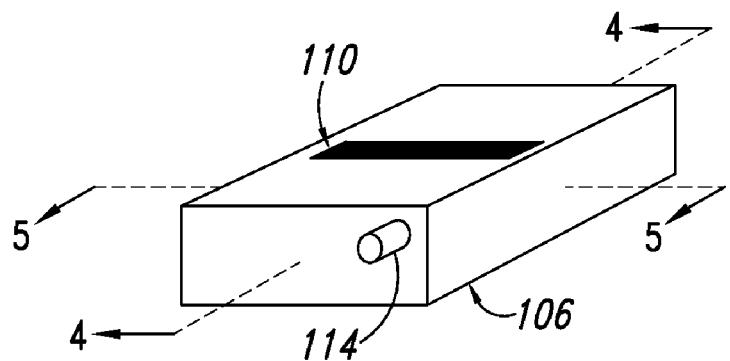
FIG. 3 is a perspective view of the wireless encoder of FIG. 1 without the plurality of wireless communication devices.
Figure 4:
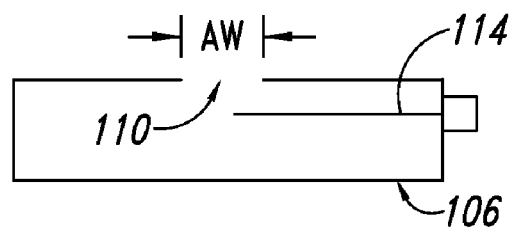
FIG. 4 is a side, schematic, cross-sectional view of the wireless encoder of FIG. 1 without the plurality of wireless communication devices.
Figure 5:
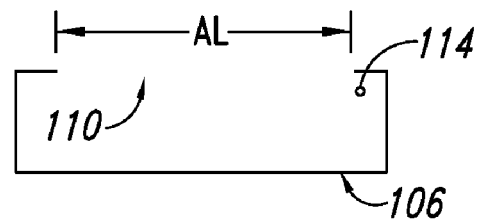
FIG. 5 is a front, schematic, cross-sectional view of the wireless encoder of FIG. 1 without the plurality of wireless communication devices.

FIG. 3 is a perspective view of the wireless encoder 100 of FIG. 1 without the plurality of wireless communication devices. FIGS. 4 and 5 illustrate side and front cross-sectional views, respectively, of the wireless encoder 100 in order to more clearly illustrate and visualize exemplary dimensions for the aperture 110. As shown in FIG. 4, the aperture 110 of the wireless encoder 100 is associated with an aperture width, AW, defined along the direction of movement of the media path. FIG. 5 illustrates an aperture length, AL, which dimension may be defined perpendicularly to the direction of movement of the media path.

In one embodiment, dimensions for the aperture 110 may be based at least in part on the dimensions of the wireless communication devices 102. For example, the aperture width, AW, may be chosen to be less than two times the separation distance, D, between adjacent wireless communication devices 102. With such an aperture width, for at least some period of time, each wireless communication device 102 is alone at the aperture 110, and each wireless communication device 102 may thus be individually encoded without encoding adjacent wireless communication devices 102. In another embodiment, the aperture width, AW, may be chosen to approximate the separation distance, D, between adjacent wireless communication devices 102. Such an embodiment may reduce the likelihood of inadvertently encoding adjacent wireless communication devices 102. In yet another embodiment, as illustrated in FIG. 2, the aperture width, AW, may be chosen to approximate the device width, DW, of the wireless communication devices 102, and may even be smaller than the device width, DW. In still other embodiments, the dimensions of the aperture 110 may be further adjusted based on the shapes and orientations of the wireless communication devices 102.

In one embodiment, the wireless encoder 100 may be further configured for use with a variety of different wireless communication devices. In order to optimally encode such wireless communication devices, the dimensions of the aperture 110 may be variable. In one embodiment, the aperture width, AW, may be adjusted based at least in part on the dimensions of different wireless communication devices encoded by the wireless encoder 100. The aperture width, AW, may be adjusted, for example, using a slidable metal bar, which may open and close the effective aperture 110. In one embodiment, an adjustment mechanism for the aperture 110 may be automatically controlled (e.g., by the control circuitry of the wireless signal generator 112 and a motor or solenoid), and the aperture dimensions may be adjusted during use based on feedback mechanisms. For example, if the wireless encoder 100 should determine that wireless communication devices are not being properly encoded, the aperture width, AW, may be automatically increased until the wireless communication devices are being properly encoded.

Description of Another Exemplary Wireless Encoder

Figure 6:
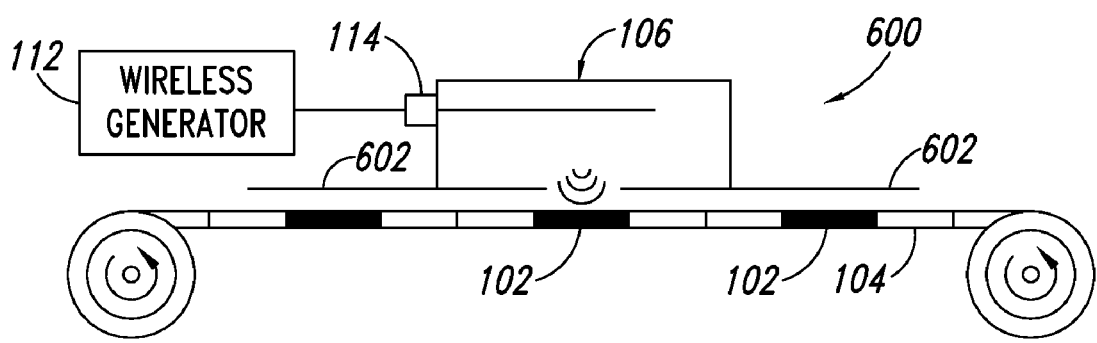
FIG. 6 is a side, schematic, cross-sectional view of a wireless encoder having at least one detuning flange encoding a plurality of wireless communication devices, according to another illustrated embodiment.
Figure 7:
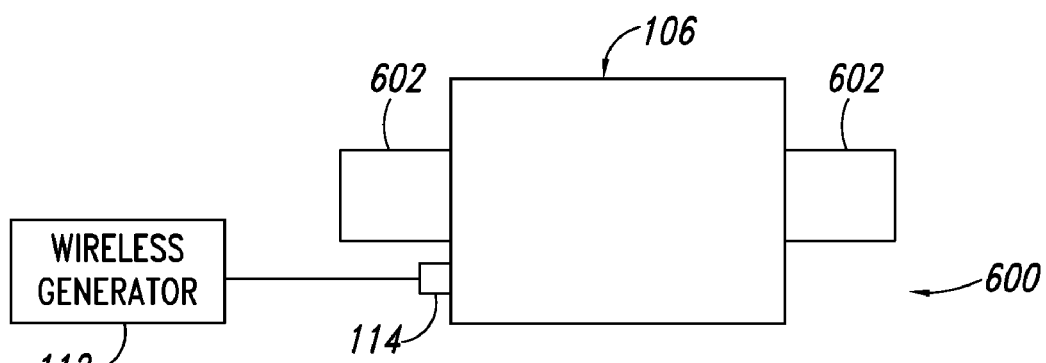
FIG. 7 is a top, schematic view of the wireless encoder of FIG. 6 without the plurality of wireless communication devices.

FIG. 6 is a side, schematic, cross-sectional view of a wireless encoder 600 including two detuning flanges 602 extending to either side of the shielded enclosure 106. FIG. 7 is a top view of the wireless encoder 600 without the plurality of wireless communication devices 102, in order to better illustrate the shape of the exemplary detuning flanges 602. The wireless encoder 600 of FIGS. 6 and 7 may function similarly to the wireless encoder 100 illustrated in FIG. 1, except as further detailed below. Where possible, similar elements are identified with identical reference numerals, and, accordingly, the above description corresponding to these elements applies equally to the embodiment of FIGS. 6 and 7.

In the illustrated embodiment, the wireless encoder 600 includes two detuning flanges 602 positioned such that the media path passes adjacent each of the detuning flanges 602. More or fewer detuning flanges may be used in other embodiments. The detuning flanges 602 may operate to detune wireless communication devices 102 that are upstream and/or downstream of the aperture 110 along the media path, which may improve the ability of the wireless encoder 600 to selectively read/write to individual wireless communication devices 102.

The detuning flanges 602 may comprise any of a variety of conductive materials operable to detune neighboring wireless communication devices 102 during the encoding process. In one embodiment, the detuning flanges 602 may be formed integrally with the shielded enclosure 106 and may comprise the same materials. For example, the detuning flanges 602 may be formed from a metallic sheet or may comprise a metallic matrix. In other embodiments, the detuning flanges 602 may be coupled to the shielded enclosure 106 by any of a variety of mechanical attachment mechanisms, including screws, rivets, welding, adhesives, etc. In still other embodiments, the detuning flanges 602 may extend near the shielded enclosure 106 but need not be coupled thereto. For example, the detuning flanges 602 may be coupled to structures adjacent the shielded enclosure 106.

The detuning flanges 602 may also be formed in a variety of shapes and sizes. In one embodiment, as most easily seen in FIG. 7, the detuning flanges 602 may each comprise rectangular pieces extending from the shielded enclosure 106, having a width approximately equal to a width of the media 104. In other embodiments, the detuning flanges 602 may comprise semi-circular, polygonal or other shapes. The detuning flanges 602 may also be sized such that, when one wireless communication device 102 is across the aperture 110, each detuning flange 602 is near at least one other wireless communication device 102, as shown in the embodiment of FIG. 6.

Description of Yet Another Exemplary Wireless Encoder

Figure 8:
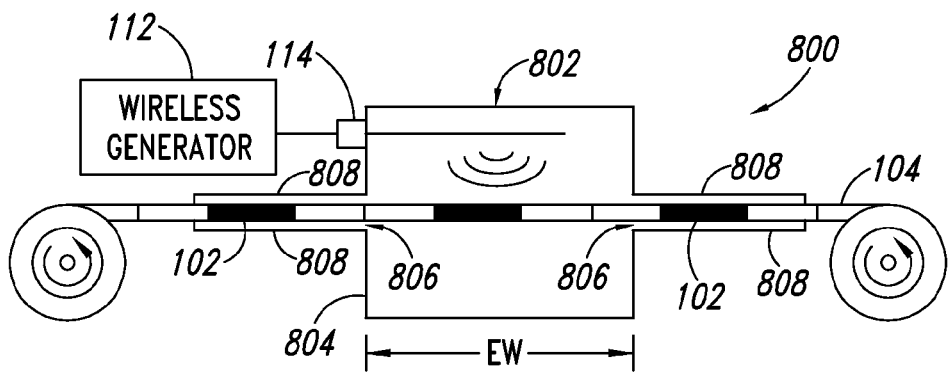
FIG. 8 is a side, schematic, cross-sectional view of a wireless encoder having at least one detuning flange encoding a plurality of wireless communication devices, according to yet another illustrated embodiment.
Figure 9:
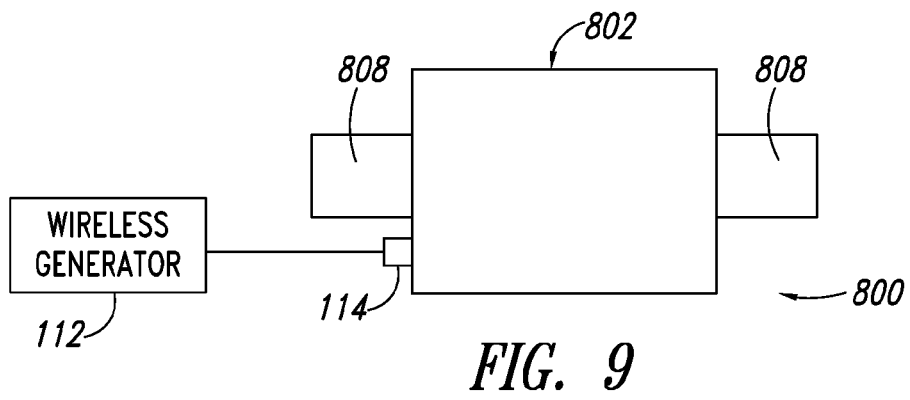
FIG. 9 is a top, schematic view of the wireless encoder of FIG. 8 without the plurality of wireless communication devices.
Figure 10:
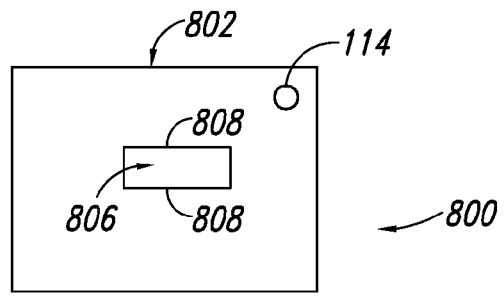
FIG. 10 is a front, schematic view of the wireless encoder of FIG. 8 without the plurality of wireless communication devices.

FIG. 8 is a side, schematic, cross-sectional view of another wireless encoder 800 encoding a plurality of wireless communication devices 102 carried by media 104. FIGS. 9 and 10 are top and front views, respectively, of the wireless encoder 800 without the plurality of wireless communication devices 102, in order to better illustrate the geometry of the wireless encoder 800.

In one embodiment, the wireless encoder 800 includes a shielded enclosure 802 having an exterior surface 804 defining at least two apertures 806 through which the media 104 may travel. The shielded enclosure 802 may be configured similarly to the shielded enclosure 106, and may substantially prevent external electromagnetic fields from penetrating to an interior of the shielded enclosure 802, and may substantially prevent internal electromagnetic fields from escaping to an exterior of the shielded enclosure 802. In one embodiment, the shielded enclosure 802 serves as a radio frequency (RF) cavity, within which electromagnetic signals for encoding the wireless communication devices 102 may be generated.

As illustrated in FIG. 8, the shielded enclosure 802 defines a generally empty RF cavity. However, in other embodiments, the shielded enclosure 802 may be at least partially filled, for example, with a dielectric material (as discussed in greater detail below). The shielded enclosure 802 may also have any of a variety of shapes. As illustrated, the shielded enclosure 802 comprises a parallelepiped cavity. In other embodiments, however, the shielded enclosure 802 may be spherical, elliptical, cylindrical, etc. Such shapes may be useful in particular applications, based on size or other considerations for the wireless encoder 800.

The shielded enclosure 802 may be sized such that an enclosure width, EW, along the direction of movement of the media path is less than two times a separation distance, D, between adjacent wireless communication devices 102. With such an enclosure width, for at least some period of time, each wireless communication device 102 is alone within the shielded enclosure 802, and each wireless communication device 102 may thus be individually encoded without encoding adjacent wireless communication devices 102. In another embodiment, as illustrated in FIG. 8, the enclosure width, EW, may be chosen to approximate the separation distance, D, between adjacent wireless communication devices 102. Such an embodiment may reduce the likelihood of inadvertently encoding adjacent wireless communication devices 102. In yet another embodiment, the enclosure width, EW, may be chosen to approximate the device width, DW, of the wireless communication devices 102. In still other embodiments, the dimensions of the shielded enclosure 802 may be further adjusted based on the shapes and orientations of the wireless communication devices 102.

As may be seen in FIG. 10, the two apertures 806 may comprise generally rectangular portals defined across from one another through the shielded enclosure 802. The apertures 806 may be sized and configured to allow passage of the media 104 through the shielded enclosure 802, in order to encode the wireless communication devices 102 one at a time. In other embodiments, the apertures 806 may, of course, comprise any of a variety of shapes. The dimensions of the apertures 806 may also be chosen to correspond to the dimensions of the media 104, in order to mitigate the escape of electromagnetic signals generated within the shielded enclosure 802.

The wireless encoder 800 may further include a wireless signal generator 112 configured to generate electromagnetic signals and thereby excite the shielded enclosure 802. For example, the shielded enclosure 802 may be excited by an antenna 114 driven by the wireless signal generator 112. The wireless signal generator 112 and antenna 114 may be configured similarly to the corresponding structures in the wireless encoder 100.

During use, the media 104 travels along a defined media path through the shielded enclosure 802 via the at least two apertures 806. Each wireless communication device 102 may pass through the shielded enclosure 802 where it may be individually encoded.

In order to prevent inadvertent communication with wireless communication devices 102 outside the shielded enclosure 802, the wireless encoder 800 may further include a plurality of detuning flanges 808. The detuning flanges 808 (four of which are illustrated in FIGS. 8-10) may be similarly configured and may function similarly to the detuning flanges 602 discussed above. In one embodiment, the detuning flanges 808 may be positioned adjacent the media path of the wireless encoder 800 to detune wireless communication devices 102 adjacent to but outside the shielded enclosure 802.

The detuning flanges 808 may comprise any of a variety of conductive materials operable to detune wireless communication devices 102 during the encoding process. In one embodiment, the detuning flanges 808 may be formed integrally with the shielded enclosure 802 and may comprise the same materials. For example, the detuning flanges 808 may be formed from metallic sheets or may comprise a metallic matrix. In other embodiments, the detuning flanges 808 may be coupled to the shielded enclosure 802 by any of a variety of mechanical attachment mechanisms, including screws, rivets, welding, adhesives, etc.

Description of Dielectric Materials in Exemplary Wireless Encoders

Figure 11:
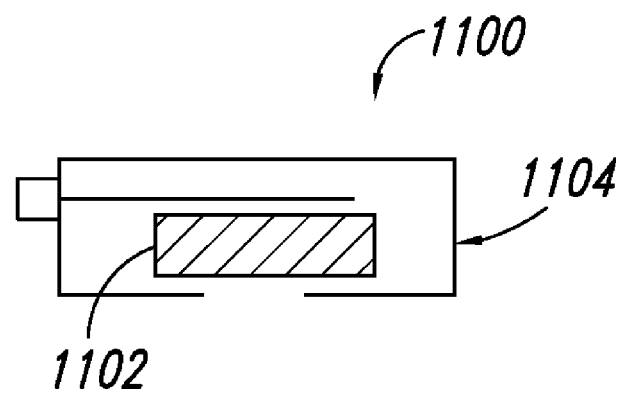
FIG. 11 is a side, schematic, cross-sectional view of a wireless encoder at least partially filled with a dielectric material, according to one illustrated embodiment.
Figure 12:
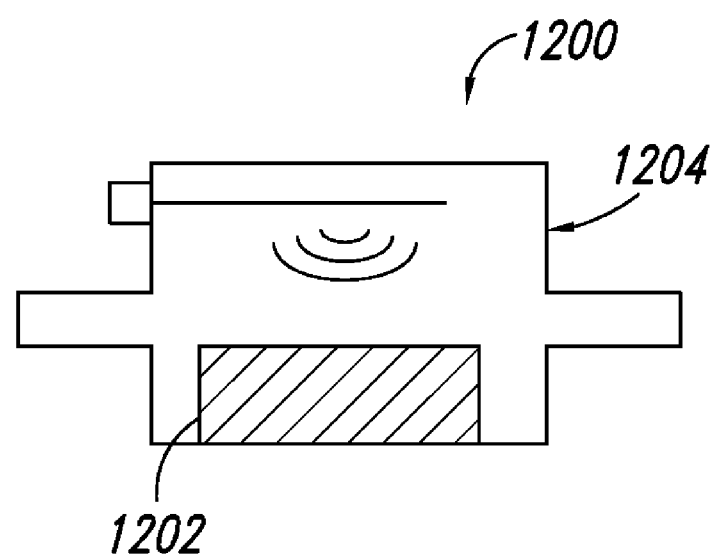
FIG. 12 is a side, schematic, cross-sectional view of a wireless encoder at least partially filled with a dielectric material, according to another illustrated embodiment.

As illustrated in FIGS. 11 and 12, wireless encoders 1100, 1200 configured in accordance with any of the above embodiments may further include dielectric materials 1102, 1202 positioned within corresponding shielded enclosures 1104, 1204. The presence of such dielectric materials 1102, 1202 may enable the RF cavities of the wireless encoders 1100, 1200 to be made smaller while maintaining similar resonance characteristics. Thus, in some embodiments, dielectric materials may be incorporated in order to make small, portable wireless encoders.

As illustrated, the dielectric materials 1102, 1202 need not completely fill the shielded enclosures 1104, 1204. However, in other embodiments, the shielded enclosures 1104, 1204 may be substantially filled with the dielectrics. The dielectric materials 1102, 1202 may also be positioned at various locations within the shielded enclosures 1104, 1204, and, in some embodiments, the dielectric materials 1102, 1202 may be repositionable within the shielded enclosures 1104, 1204 in order to optimize the performance of the wireless encoders 1100, 1200.

A variety of different materials may be used as the dielectric materials 1102, 1202. Gases, solids or liquids may be used in different applications, and, in particular, gases, solids or liquids having dielectric constants greater than that of air. In one embodiment, the dielectric materials 1102, 1202 may be chosen from among materials with a dielectric constant greater than 2 (where the dielectric constant of a vacuum is defined as 1). In another embodiment, the dielectric materials 1102, 1202 may be chosen from among materials with a dielectric constant greater than 10. They may comprise, for example: porcelain (ceramic), mica, glass, plastics, or the oxides of various metals.

Description of an Exemplary Wireless Encoder including Dielectric Material

Figure 13:
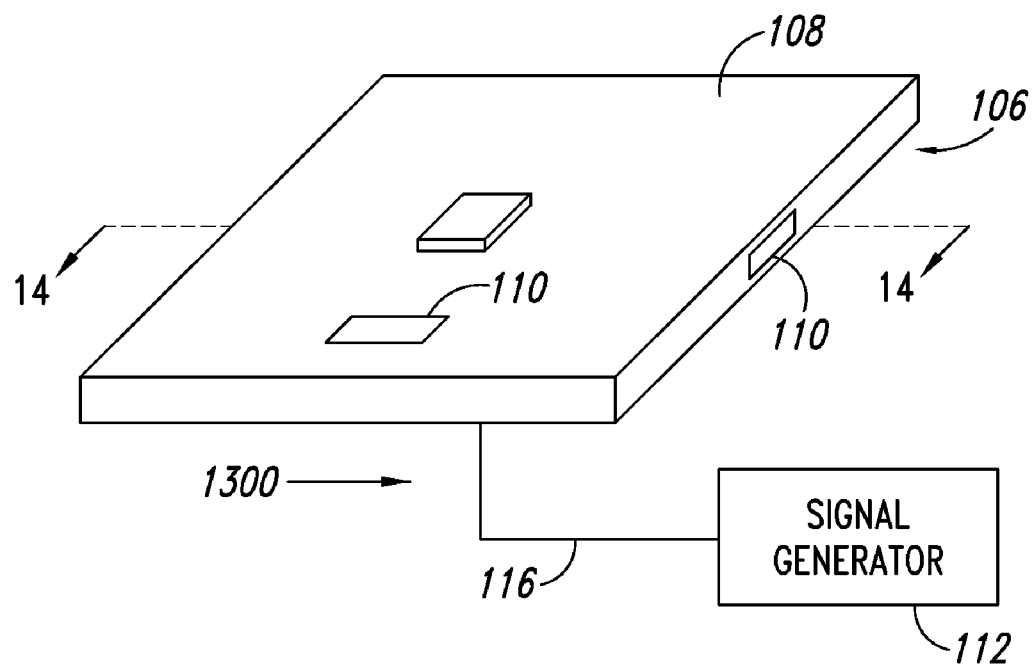
FIG. 13 is a perspective view of a wireless encoder at least partially filled with a dielectric material, according to one illustrated embodiment.
Figure 14:
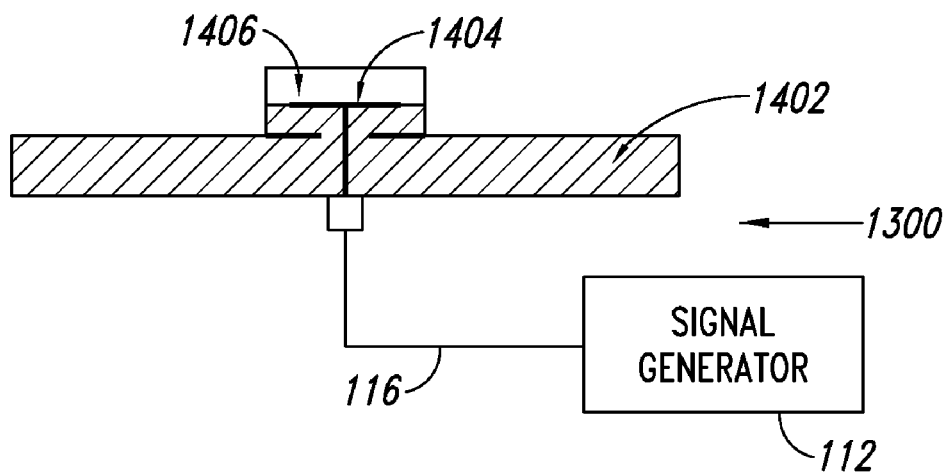
FIG. 14 is a side, schematic, cross-sectional view of the wireless encoder of FIG. 13.

FIG. 13 is a perspective view of yet another wireless encoder 1300 for encoding wireless communication devices 102, according to one illustrated embodiment. FIG. 14 is a side, schematic, cross-sectional view of the wireless encoder 1300, in order to better illustrate the location of dielectric material 1402 within the wireless encoder 1300, and a shape of an antenna 1404. The wireless encoder 1300 may function similarly to the wireless encoder 100 illustrated in FIG. 1, except as further detailed below. Where possible, similar elements are identified with identical reference numerals, and, accordingly, the above description corresponding to these elements applies equally to the embodiment of FIGS. 13 and 14.

As illustrated, the wireless encoder 1300 includes a shielded enclosure 106 having an exterior surface 108 defining two apertures 110. The shielded enclosure 106 may be configured to substantially prevent external electromagnetic fields from penetrating to an interior of the shielded enclosure 106, and to substantially prevent internal electromagnetic fields from escaping to an exterior of the shielded enclosure 106 except via the apertures 110. In one embodiment, the shielded enclosure 106 serves as a radio frequency (RF) cavity, within which electromagnetic signals for encoding wireless communication devices 102 (not shown) may be generated.

As best shown in FIG. 14, the shielded enclosure 106 may be partially filled with a dielectric material 1402, with a small amount of air 1406 remaining above the antenna 1404. The dielectric material 1402 may comprise any of the dielectrics discussed above with reference to FIGS. 11 and 12. In one embodiment, the dielectric material 1402 may comprise FR-4 material (such as that used to make printed circuit boards).

The apertures 110 may comprise generally rectangular portals defined through the exterior surface 108 of the shielded enclosure 106, for encoding adjacent wireless communication devices 102. The apertures 110 may comprise any of a variety of shapes, and, in different embodiments, more or fewer apertures may be defined through the shielded enclosure 106. The dimensions of the apertures 110 may also be chosen based at least in part on the characteristics of electromagnetic signals generated within the shielded enclosure 106, as well as the dimensions of the wireless communication devices 102.

The wireless encoder 1300 may further include a wireless signal generator 112 configured to generate electromagnetic signals and thereby excite the shielded enclosure 106. For example, the shielded enclosure 106 may be excited by an antenna 1404 driven by the wireless signal generator 112 via a lead 116. In one embodiment, the lead 116 may comprise a RF coaxial cable.

During the encoding process, the wireless signal generator 112 may excite the shielded enclosure 106 via the antenna 1404. Wireless communication devices may then be passed across either or both of the apertures 110 one at a time. The wireless communication devices 102 may each be encoded similarly or may be encoded using individual parameters, in accordance with commands from the control circuitry of the wireless signal generator 112.

Description of an Exemplary Wireless Encoder with Multiple Antennas

Figure 15:
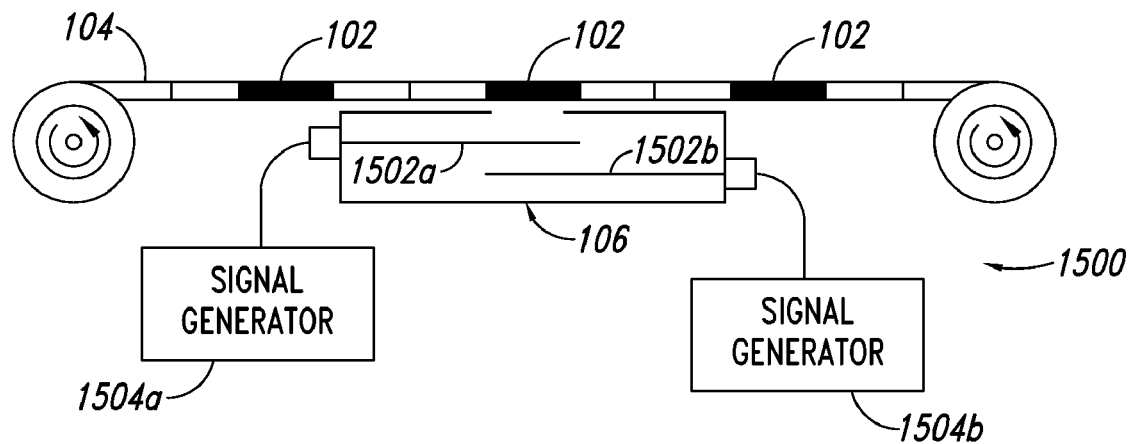
FIG. 15 is a side, schematic, cross-sectional view of a wireless encoder including at least two wireless signal generators, according to one illustrated embodiment.

FIG. 15 is a side, schematic, cross-sectional view of another exemplary wireless encoder 1500 incorporating at least two antennas 1502a, 1502b (collectively, 1502) and corresponding wireless signal generators 1504a, 1504b (collectively, 1504). The wireless encoder 1500 may function similarly to the wireless encoder 100 illustrated in FIG. 1, except as further detailed below. Where possible, similar elements are identified with identical reference numerals, and, accordingly, the above description corresponding to these elements applies equally to the embodiment of FIG. 15.

In the illustrated embodiment, the two antennas 1502 and corresponding wireless signal generators 1504 may be designed to optimally function at different frequencies, and/or may be designed to optimally communicate with differently configured wireless communication devices 102 (e.g., horizontally vs. vertically oriented wireless communication devices). These antennas 1502 and wireless signal generators 1504 may, for example, be configured in accordance with the variations described above with reference to the antenna 114 and wireless signal generator 112.

In one embodiment, the two sets of antennas 1502 and wireless signal generators 1504 are not operated simultaneously. Instead, master control circuitry may switch between these sets depending upon the desired frequency for wireless communication and/or based on the target wireless communication devices 102. Indeed, in other embodiments, even more antennas and corresponding wireless signal generators may be deployed.

In other embodiments, a single wireless signal generator may be configured to generate a plurality of different frequencies for communications with different wireless communication devices 102. For example, a single wireless signal generator may be coupled by leads to various antennas and may be configured to generate signals at different frequencies for each antenna.

Figure 16:
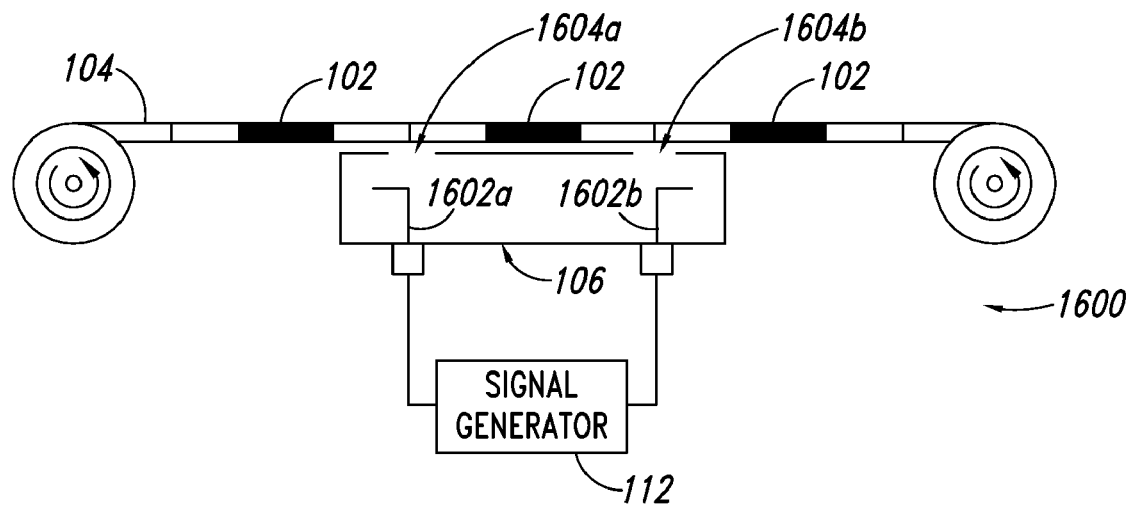
FIG. 16 is a side, schematic, cross-sectional view of a wireless encoder including at least two antennas and at least two apertures, according to one illustrated embodiment.

Description of Another Exemplary Wireless Encoder with Multiple Antennas and Multiple Apertures FIG. 16 is a side, schematic, cross-sectional view of another exemplary wireless encoder 1600 incorporating at least two antennas 1602a, 1602b (collectively, 1602) and corresponding apertures 1604a, 1604b (collectively, 1604). The wireless encoder 1600 may function similarly to the wireless encoder 100 illustrated in FIG. 1, except as further detailed below. Where possible, similar elements are identified with identical reference numerals, and, accordingly, the above description corresponding to these elements applies equally to the embodiment of FIG. 16.

In the illustrated embodiment, the two antennas 1602 are coupled to a single wireless signal generator 112 having two outputs. The wireless signal generator 112 may be configured to generate a plurality of different frequencies for communications with different wireless communication devices 102. Each of the antennas 1602 may similarly be designed to optimally function at different frequencies, and/or may be designed to optimally communicate with differently configured wireless communication devices 102 (e.g., horizontally vs. vertically oriented wireless communication devices). These antennas 1602 and the wireless signal generator 112 may, for example, be configured in accordance with the variations described above with reference to the antenna 114 and wireless signal generator 112.

In one embodiment, the two antennas 1602 are not operated simultaneously. Instead, control circuitry within the wireless signal generator 112 may switch between these antennas 1602 depending upon the desired frequency for wireless communication and/or based on the target wireless communication devices 102. In another embodiment, the two antennas 1602 may be operated simultaneously. Because the antennas 1602 are located proximate corresponding apertures 1604, the antennas 1602 may preferentially excite wireless communication devices 102 passing near a corresponding aperture 1604, even though both antennas 1602 are operated simultaneously. In such an embodiment, different sets of wireless communication devices 102 may be passed over the apertures 1604 substantially simultaneously.

Description of Exemplary Wireless Encoders with Wave Conductors

Figure 17:
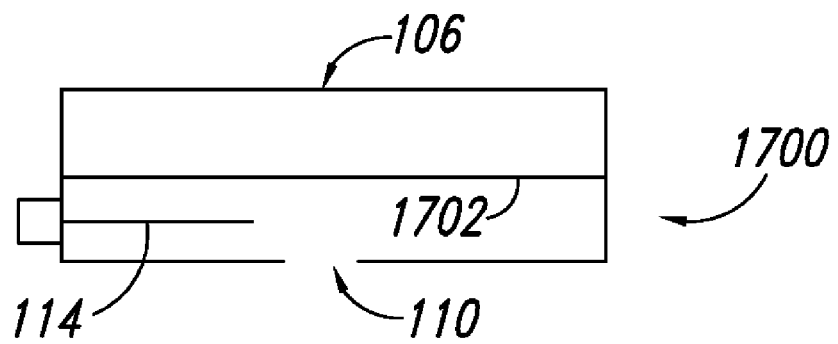
FIG. 17 is a side, schematic, cross-sectional view of a wireless encoder including a wave conductor, according to one illustrated embodiment.
Figure 18:
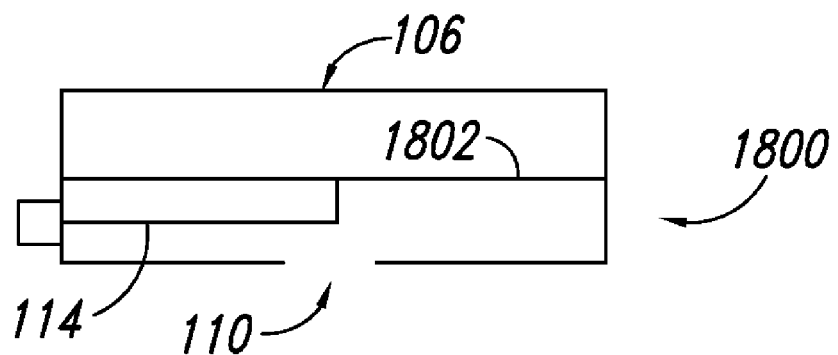
FIG. 18 is a side, schematic, cross-sectional view of a wireless encoder including a wave conductor coupled to an antenna, according to one illustrated embodiment.

FIG. 17 is a side, schematic, cross-sectional view of another wireless encoder 1700 including a wave conductor 1702 physically separated from an antenna 114. FIG. 18 illustrates yet another wireless encoder 1800 including a wave conductor 1802 that is coupled to an antenna 114. The wireless encoder 1700 and the wireless encoder 1800 may function similarly to the wireless encoder 100 illustrated in FIG. 1, except as further detailed below. Where possible, similar elements are identified with identical reference numerals, and, accordingly, the above description corresponding to these elements applies equally to the embodiments of FIGS. 17 and 18.

As illustrated, the wave conductors 1702, 1802 comprise elongate conducting elements running between at least two walls of the shielded enclosures 106. The wave conductors 1702, 1802 may comprise any of a variety of conductive materials. In one embodiment, the wave conductors 1702, 1802 may comprise half-wavelength long coaxial cables terminated on both ends with short terminations. In another embodiment, the wave conductors 1702, 1802 may comprise striplines terminated on both ends with short terminations. In still other embodiments, the wave conductors 1702, 1802 may be twisted or may have other geometrical shapes, which may allow some reduction of the size of the shielded enclosures 106. Although each wireless encoder 1700, 1800 is illustrated as including a single wave conductor 1702, 1802, it may be understood that a plurality of wave conductors may be implemented within each wireless encoder 1700, 1800 in other embodiments.

In one embodiment, the wave conductors 1702, 1802 may be center conductors, running along a central axis of the wireless encoders 1700, 1800. In other embodiments, the wave conductors 1702, 1802 may run between any two points within the shielded enclosures 106.

During use of the wireless encoders 1700, 1800, the wave conductors 1702, 1802 may enable the propagation of a transversal electro-magnetic (TEM) wave, reflecting between the ends of the wave conductors 1702, 1802. The antennae 114 and corresponding wireless signal generators (not shown) may be used to generate this resonant wave within the shielded enclosures 106 and along the wave conductors 1702, 1802. In such an embodiment, the size of the shielded enclosures 106 may be further reduced. As described above, the wireless encoders 1700, 1800 may also, of course, be filled with a dielectric material, enabling the size of the shielded enclosures 106 to be still further reduced.

Description of Another Exemplary Wireless Encoder with a Wave Conductor

Figure 19:
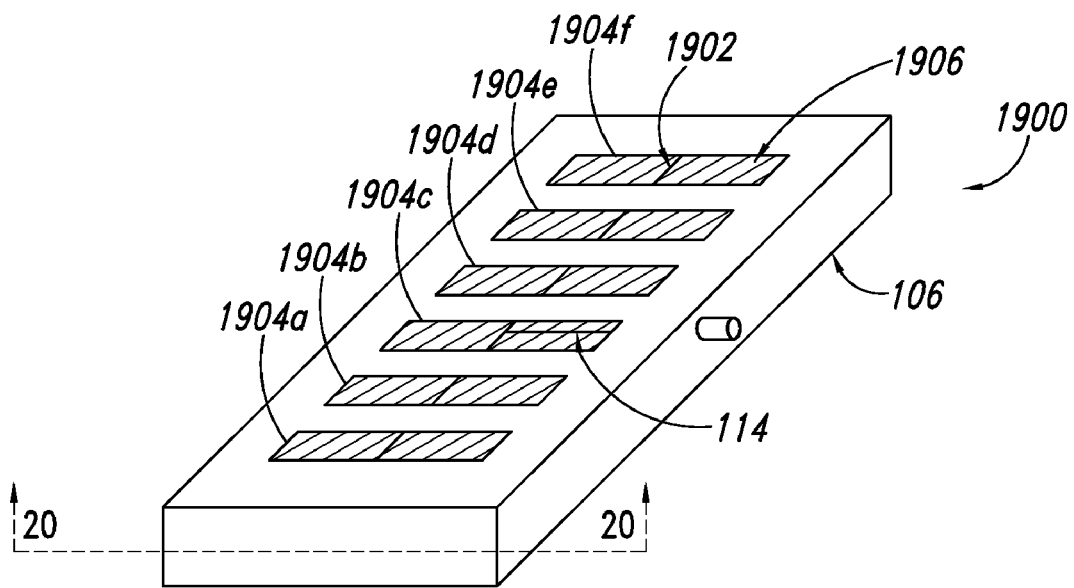
FIG. 19 is a perspective view of a wireless encoder including a wave conductor and a plurality of apertures, according to one illustrated embodiment.
Figure 20:
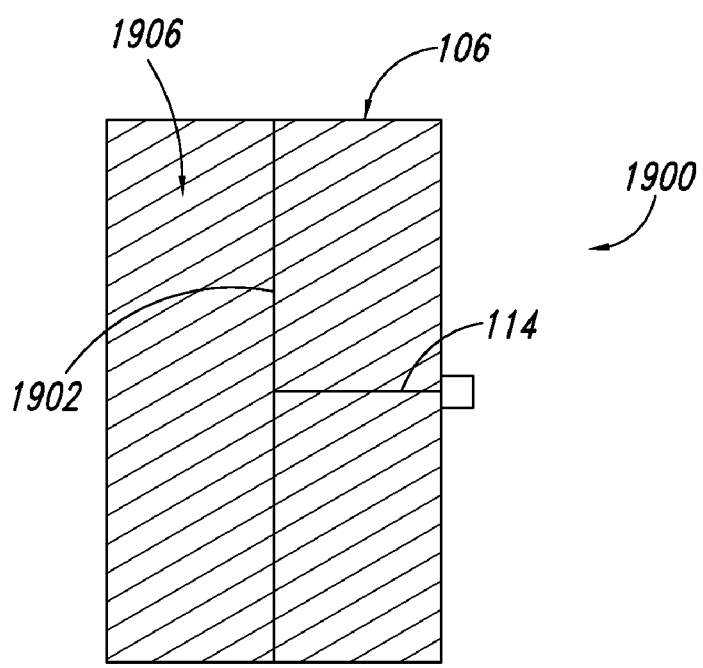
FIG. 20 is a top, schematic, cross-sectional view of the wireless encoder of FIG. 19.

FIG. 19 is a perspective view, and FIG. 20 is a top, schematic, cross-sectional view of a wireless encoder 1900 including a wave conductor 1902 and a plurality of apertures 1904a-f (collectively, 1904). The wireless encoder 1900 may function similarly to the wireless encoder 100 illustrated in FIG. 1, except as further detailed below. Where possible, similar elements are identified with identical reference numerals, and, accordingly, the above description corresponding to these elements applies equally to the embodiment of FIGS. 19 and 20.

In the illustrated embodiment, the wave conductor 1902 comprises a central stripline embedded within dielectric material 1906 substantially filling the space within the shielded enclosure 106. An antenna 114 coupled to the wave conductor 1902 may include a coaxial RF input port exposed externally from the shielded enclosure 106 to which a wireless signal generator (not shown) may be coupled. In one embodiment, the ground of the coaxial RF input port may be connected to the exterior surface of the shielded enclosure 106, while the feed comprises the internally extending portion of the antenna 114.

The plurality of apertures 1904 may be configured to enable wireless communication with a plurality of wireless communication devices traveling along a media path substantially simultaneously. In other embodiments, different shapes and sizes of the plurality of apertures 1904 may be used to specially configure each aperture for communication with particular wireless communication devices. In yet another embodiment, a plurality of media paths may be defined across the plurality of apertures 1904, such that a plurality of wireless communication devices may be encoded in parallel.

Description of Another Exemplary Wireless Encoder with a Wave Conductor

Figure 21:
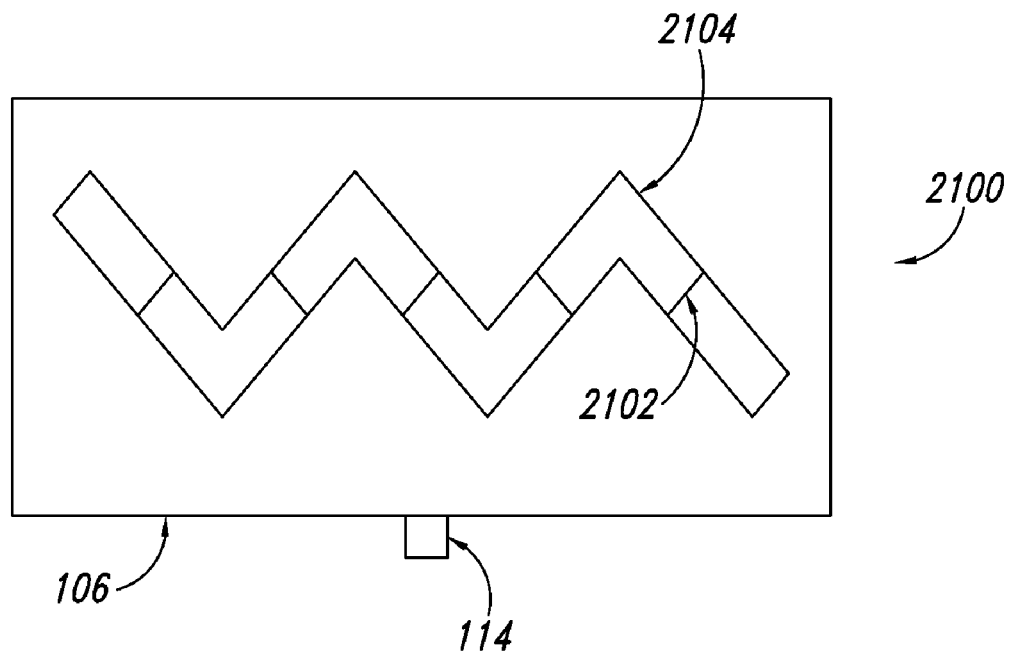
FIG. 21 is a top, schematic view of a wireless encoder including a wave conductor and a zig-zag aperture, according to one illustrated embodiment.
Figure 22:
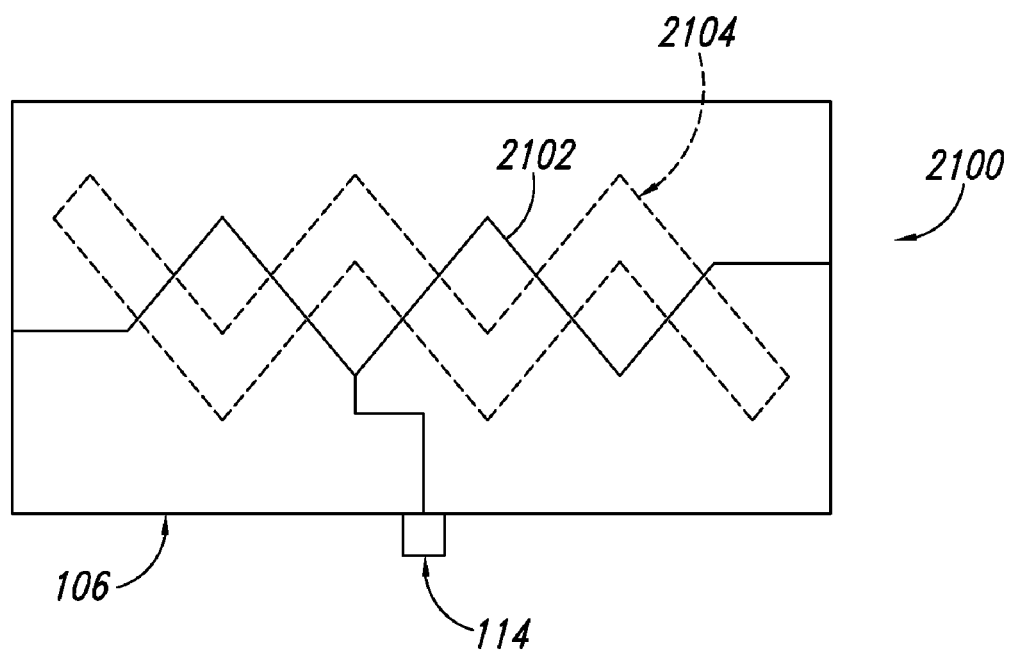
FIG. 22 is a top, schematic, cross-sectional view of the wireless encoder of FIG. 21, with the zig-zag aperture shown in dashed lines.

FIG. 21 is a top, schematic view, and FIG. 22 is a top, schematic, cross-sectional view of a wireless encoder 2100 including a wave conductor 2102 having a substantially zig-zag shape and a zig-zag aperture 2104. The wireless encoder 2100 may function similarly to the wireless encoder 100 illustrated in FIG. 1, except as further detailed below. Where possible, similar elements are identified with identical reference numerals, and, accordingly, the above description corresponding to these elements applies equally to the embodiment of FIGS. 21 and 22.

As illustrated, the wave conductor 2102 and aperture 2104 form zig-zag shapes in the wireless encoder 2100. In one embodiment, such shapes may facilitate wireless communication with wireless communication devices oriented in a variety of different directions because the electromagnetic fields emerging from the aperture 2104 may have substantial off-axis components relative to a media path. The shape of the wave conductor 2102 may also enable further reduction in the size of the shielded enclosure 106 while creating electromagnetic field components in several directions.

Of course, in other embodiments, other configurations of the wave conductor 2102 and aperture 2104 may be employed. As described above, the wave conductor 2102 and the aperture 2104 may have any of a variety of geometries, e.g., sinusoidal or oblong, and they need not share a common geometry. In one embodiment, the wave conductor 2102 may have a zig-zag shape (as illustrated), but the aperture 2102 may comprise a rectangular portal similar to that shown in FIG. 1. In another embodiment, the aperture 2104 may have a zig-zag shape, and the wave conductor 2102 may be substantially straight. In still other embodiments, the aperture 2104 may comprise a plurality of apertures at different angles relative to the media path defined along the exterior surface of the shielded enclosure 106.

Figure 23:
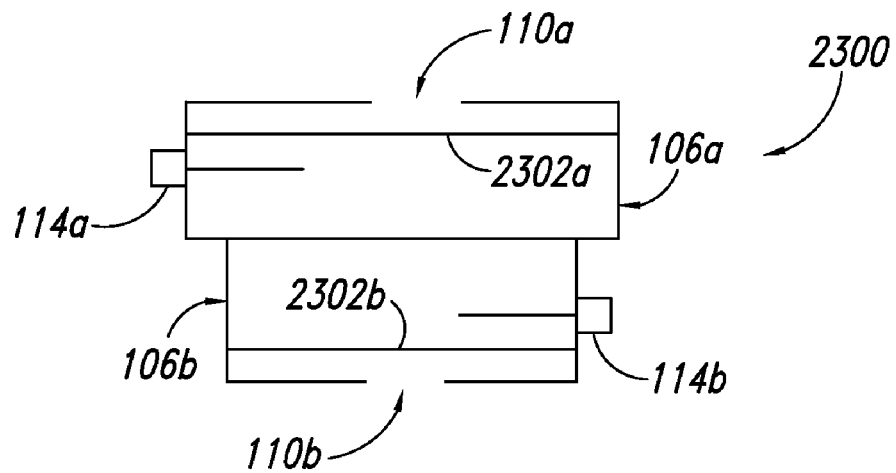
FIG. 23 is a side, schematic, cross-sectional view of a wireless encoder including two shielded enclosures, according to one illustrated embodiment.
Figure 24:
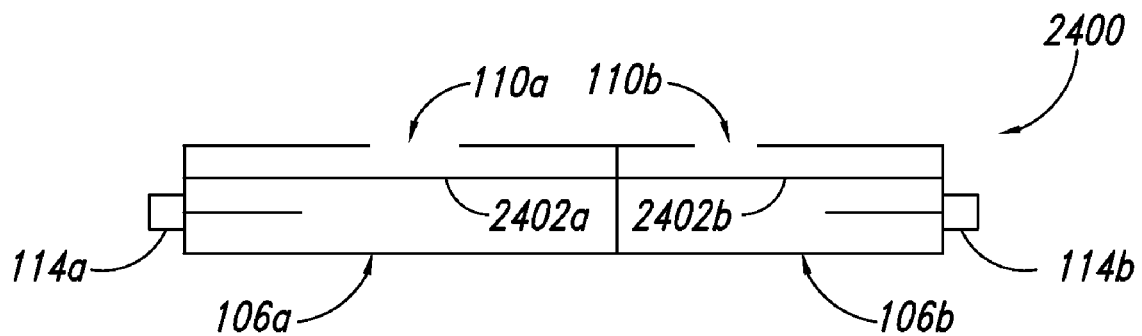
FIG. 24 is a side, schematic, cross-sectional view of another wireless encoder including two shielded enclosures, according to one illustrated embodiment.

Description of Another Exemplary Wireless Encoder with Multiple Shielded Enclosures FIG. 23 is a side, schematic, cross-sectional view of a wireless encoder 2300 including two shielded enclosures 106a, 106b (collectively, 106). FIG. 24 is a side, schematic, cross-sectional view of another wireless encoder 2400 also including two shielded enclosures 106a, 106b (collectively, 106). Each of these wireless encoders 2300, 2400 includes a plurality of shielded enclosures 106 that may be differently configured to facilitate communication at different frequencies or with different wireless communication devices. In general, the wireless encoders 2300, 2400 may function similarly to the wireless encoder 100 illustrated in FIG. 1, except as further detailed below. Where possible, similar elements are identified with identical reference numerals, and, accordingly, the above description corresponding to these elements applies equally to the embodiments of FIGS. 23 and 24.

In one embodiment, each of the shielded enclosures 106a, 106b of the wireless encoder 2300 may include a corresponding wave conductor 2302a, 2302b. The geometry of the shielded enclosures 106 may facilitate operation in a particular frequency band. For example, in one embodiment, the shielded enclosure 106a may be configured to operate within a band used in the United States (e.g., 902-928 MHz), while the shielded enclosure 106b may be configured to operate within a band used in Europe (e.g., 865-868 MHz). Other components of the wireless encoder 2300 may also be specially configured to facilitate operation in such frequency bands.

In one embodiment, the orientation of the media path of the wireless encoder 2300 may be chosen in order to encode wireless communication devices configured to operate in one or another of the possible operating frequencies. For example, the wireless encoder 2300 may be initially oriented to encode wireless communication devices used in the United States using the shielded enclosure 106a, and the wireless encoder 2300 may later be reoriented relative to the media path to encode wireless communication devices used in Europe using the shielded enclosure 106b.

The wireless encoder 2400 may be configured similarly to the wireless encoder 2300, except that the shielded enclosures 106 of the wireless encoder 2400 are arranged linearly along the media path. In such an embodiment, control circuitry of one or more wireless signal generators (not shown) may be employed to selectively excite one or another of the shielded enclosures 106 for encoding different wireless communication devices.

Description of an Exemplary Method for Encoding Wireless Communication Devices

Figure 25:
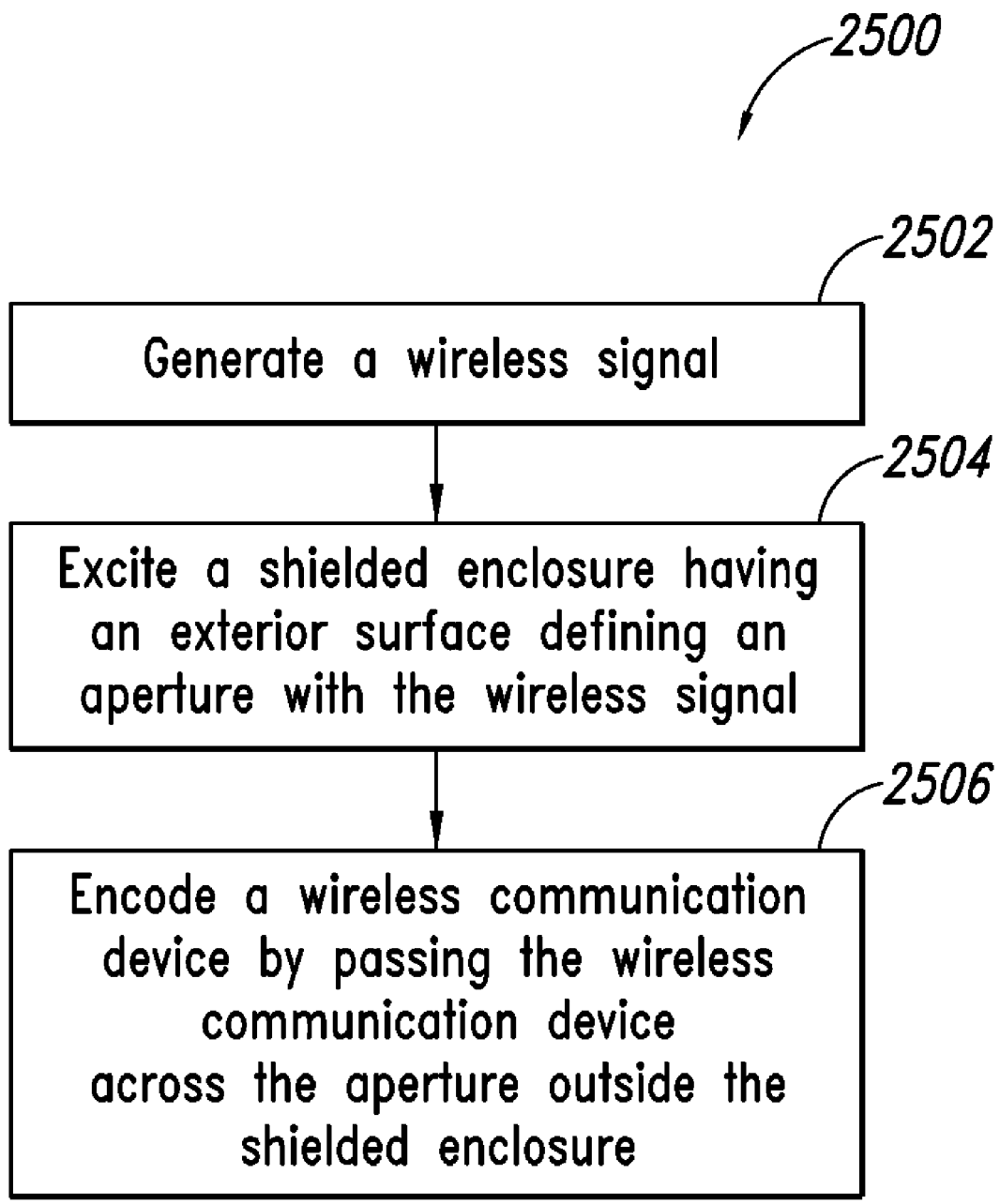
FIG. 25 is a flow diagram illustrating a method of encoding wireless communication devices, according to one illustrated embodiment.

FIG. 25 illustrates a flow diagram for a method 2500 of encoding wireless communication devices 102, according to one embodiment. This method 2500 will be discussed in the context of the wireless encoder 100 of FIG. 1. However, it may be understood that the acts disclosed herein may also be executed using differently configured wireless encoders in accordance with the disclosure herein.

The method begins at 2502, when a wireless signal is generated. In one embodiment, the wireless signal generator 112 and corresponding antenna 114 may be used to generate the wireless signal. In other embodiments, other structures may be used to generate the wireless signal.

The wireless signal may have any appropriate power or frequency for providing wireless communications between the wireless encoder 100 and the wireless communication devices 102. In one embodiment, different power levels and frequencies may be chosen depending on the target wireless communication devices 102, and, as discussed above, different wireless signal generators and antennas may be used in order to communicate at these frequencies/power levels.

The wireless signal may also be encoded with information/data. In one embodiment, for example, the wireless signal may incorporate executable instructions, or operating instructions that may be decoded by the wireless communication devices 102 upon receipt. In other embodiments, the wireless signal may activate the wireless communication devices 102 or may activate certain functions of the wireless communication devices 102.

At 2504, a shielded enclosure 106 having an exterior surface 108 defining an aperture 110 may be excited with the wireless signal. As discussed at length above, in one embodiment, the antenna 114 is at least partially disposed within the shielded enclosure 106 to excite the shielded enclosure 106 with the generated wireless signal. The shielded enclosure 106 may be appropriately sized and configured such that the wireless signal resonates within the RF cavity defined therein.

At 2506, a wireless communication device 102 may be encoded by passing the wireless communication device 102 across the aperture 110 outside the shielded enclosure 106. As described in detail above, the wireless communication devices 102 may be individually encoded as they are passed adjacent the aperture 110. In one embodiment, for example, a media path for media 104 carrying the wireless communication devices 102 may be designed to pass near the aperture 110 during encoding.

In one embodiment, wireless communication devices 102 adjacent the encoded wireless communication device 102 need not be encoded simultaneously with the encoded wireless communication device 102. Instead, the adjacent wireless communication devices 102 may be shielded by the exterior surface 108 of the shielded enclosure 106, or they may be detuned by adjacent detuning flanges, to prevent inadvertent wireless communications with these devices 102.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

We claim:

1. A wireless encoder for encoding a plurality of wireless communication devices carried by media, comprising:
    a shielded enclosure having an exterior surface defining an aperture;
    a first wireless signal generator configured to excite the shielded enclosure;
    a media path along which the media carrying the plurality of wireless communication devices travels, the media path passing at least proximate the aperture of the shielded enclosure; and
    a second wireless signal generator configured to excite the shielded enclosure.

2. The wireless encoder of claim 1, wherein a width of the aperture is less than two times a separation distance between adjacent wireless communication devices carried by the media.

3. The wireless encoder of claim 1, wherein the media path is defined at least in part by a plurality of rollers for mounting rolls holding the media.

4. A wireless encoder for encoding a plurality of wireless communication devices carried by media, comprising:
    a shielded enclosure having an exterior surface defining an aperture;
    a wireless signal generator configured to excite the shielded enclosure, wherein the exterior surface of the shielded enclosure defines a second aperture, and further comprising at least two antennas coupled to the wireless signal generator, the at least two antennas located at least partially within the shielded enclosure and configured to excite the shielded enclosure substantially simultaneously; and
    a media path along which the media carrying the plurality of wireless communication devices travels, the media path passing through the shielded enclosure via the first aperture and the second aperture.

5. The wireless encoder of claim 4, wherein one of the at least two antennas is located proximate the aperture, and another of the at least two antennas is located proximate the second aperture.

6. The wireless encoder of claim 4, further comprising a wave conductor coupled between at least two walls of the shielded enclosure, the wave conductor located within the shielded enclosure.

7. The wireless encoder of claim 6, further comprising an antenna coupled to the wireless signal generator, the antenna located at least partially within the shielded enclosure and configured to excite the shielded enclosure.

8. The wireless encoder of claim 7, wherein the antenna is coupled to the wave conductor.

9. The wireless encoder of claim 6, wherein the wave conductor enables a transversal electromagnetic wave to be generated within the shielded enclosure.

10. The wireless encoder of claim 6, wherein the wave conductor has a substantially zig-zag shape.

11. The wireless encoder of claim 4, wherein the exterior surface of the shielded enclosure defines a plurality of apertures having different shapes.

12. The wireless encoder of claim 11, wherein the plurality of apertures have different orientations with respect to the media path.

13. The wireless encoder of 4, wherein a position of the shielded enclosure relative to the media path is adjustable.

14. The wireless encoder of claim 13, wherein an orientation of the shielded enclosure relative to the media path is adjustable.

15. A wireless encoder for encoding a plurality of wireless communication devices carried by media, comprising:
- a first shielded enclosure having a first exterior surface defining a first aperture;
- a second shielded enclosure having a second exterior surface defining a second aperture, the second shielded enclosure having a different geometry than the first shielded enclosure;
- a media path along which the media carrying the plurality of wireless communication devices travels, the media path passing at least proximate the first aperture and the second aperture outside the first shielded enclosure and the second shielded enclosure; and
- a wireless signal generator configured to excite the first shielded enclosure and the second shielded enclosure.

16. The wireless encoder of claim 15, wherein the first shielded enclosure is configured to resonate at a first frequency, and the second shielded enclosure is configured to resonate at a second frequency different than the first frequency.

17. A wireless encoder for encoding a plurality of wireless communication devices carried by media, comprising:
- a shielded enclosure having an exterior surface defining at least two apertures;
- at least one detuning flange extending externally to the shielded enclosure near at least one of the at least two apertures;
- a wireless signal generator configured to excite the shielded enclosure; and
- a media path along which the media carrying the plurality of wireless communication devices travels, the media path passing adjacent the at least one detuning flange and through the shielded enclosure via the at least two apertures.

18. The wireless encoder of claim 17, wherein the shielded enclosure is at least partially filled with a dielectric material having a dielectric constant greater than that of air.

19. The wireless encoder of claim 17, wherein the at least one detuning flange is configured to detune nearby wireless communication devices.

20. The wireless encoder of claim 17, which includes at least four detuning flanges, each of the at least four detuning flanges extending externally to the shielded enclosure near at least one of the at least two apertures, and the media path passes adjacent to each of the at least four detuning flanges.

21. A wireless encoder for encoding a plurality of wireless communication devices carried by media, comprising:
- a shielded enclosure having an exterior surface defining at least two apertures, the shielded enclosure at least partially filled with a dielectric material;
- a wireless signal generator configured to excite the shielded enclosure; and
- a media path along which the media carrying the plurality of wireless communication devices travels, the media path passing through the shielded enclosure via the at least two apertures.

22. A method of encoding a plurality of wireless communication devices carried by media, the method comprising:
- generating a first wireless signal with a first wireless signal generator;
- exciting a shielded enclosure having an exterior surface defining an aperture with the first wireless signal;
- generating a second wireless signal with a second wireless signal generator;
- exciting the shielded enclosure with the second wireless signal; and
- moving the media carrying the plurality of wireless communication devices along a media path, the media path passing at least proximate the aperture of the shielded enclosure.

23. The method of claim 22, further comprising:
encoding a plurality of wireless communication devices by passing the plurality of wireless communication devices across the aperture outside the shielded enclosure.

24. The method of claim 23, further comprising:
detuning at least one of the plurality of wireless communication devices while another of the plurality of wireless communication devices is encoded.

25. The method of claim 23, further comprising:
adjusting a width of the aperture based at least in part on dimensions of the plurality of wireless communication devices.

* * * * *